(12) United States Patent
Joshi et al.

(10) Patent No.: US 6,671,825 B1
(45) Date of Patent: Dec. 30, 2003

(54) METHOD AND APPARATUS FOR DEBUGGING A SOFTWARE PROGRAM

(75) Inventors: Vikram Joshi, Los Gatos, CA (US); Alex Tsukerman, Foster City, CA (US); Shari Yamaguchi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 585 days.

(21) Appl. No.: 09/649,310

(22) Filed: Aug. 28, 2000

Related U.S. Application Data

(60) Provisional application No. 60/166,598, filed on Nov. 19, 1999.

(51) Int. Cl.[7] ................................................. G06F 11/00
(52) U.S. Cl. .......................... 714/38; 717/124; 717/130
(58) Field of Search ............................ 714/38; 717/124, 717/130

(56) References Cited

U.S. PATENT DOCUMENTS

| | | | |
|---|---|---|---|
| 5,129,082 A | | 7/1992 | Tirfing et al. |
| 5,197,005 A | | 3/1993 | Shwartz et al. |
| 5,437,027 A | * | 7/1995 | Bannon et al. ......... 707/103 R |
| 5,561,763 A | | 10/1996 | Eto et al. |
| 5,613,098 A | * | 3/1997 | Landau et al. ................ 703/20 |
| 5,675,803 A | | 10/1997 | Preisler et al. |
| 5,781,776 A | * | 7/1998 | Johnston et al. ............ 717/130 |
| 5,854,924 A | | 12/1998 | Rickel et al. |
| 5,946,689 A | | 8/1999 | Yanaka et al. |
| 5,950,198 A | | 9/1999 | Falls et al. |
| 5,974,418 A | | 10/1999 | Blinn et al. |
| 6,003,143 A | * | 12/1999 | Kim et al. ..................... 714/38 |
| 6,029,178 A | | 2/2000 | Martin et al. |
| 6,085,029 A | | 7/2000 | Kolawa et al. |
| 6,108,659 A | | 8/2000 | Vincent |
| 6,112,025 A | | 8/2000 | Mulchandani et al. |
| 6,163,858 A | | 12/2000 | Bodamer |
| 6,167,535 A | * | 12/2000 | Foote et al. .................. 714/38 |
| 6,216,237 B1 | * | 4/2001 | Klemm et al. ................ 714/38 |
| 6,226,787 B1 | | 5/2001 | Serra et al. |
| 6,263,491 B1 | * | 7/2001 | Hunt ............................ 717/130 |
| 6,330,670 B1 | * | 12/2001 | England et al. ................ 713/2 |
| 6,374,268 B1 | | 4/2002 | Testardi |
| 6,378,124 B1 | | 4/2002 | Bates et al. |
| 6,397,125 B1 | | 5/2002 | Goldring et al. |
| 6,412,106 B1 | | 6/2002 | Leask et al. |
| 6,463,578 B1 | * | 10/2002 | Johnson ....................... 717/124 |
| 6,490,721 B1 | | 12/2002 | Gorshkov et al. |
| 6,542,844 B1 | | 4/2003 | Hanna |
| 2003/0004952 A1 | | 1/2003 | Nixon et al. |

OTHER PUBLICATIONS

"Solaris 2.6 Reference Manual AnswerBook >> man pp.(3): Library Routines", 5 pages, 2001, http://docs.sun.com:80/ab2@LegacyPageView?toc=SUNWab_40_4%3A%2Fsafedir%2Fsp.

* cited by examiner

Primary Examiner—Robert Beausoliel
Assistant Examiner—Bryce P. Bonzo
(74) Attorney, Agent, or Firm—Hickman Palermo Truong & Becker LLP; Edward A. Becker

(57) ABSTRACT

A method and apparatus for debugging a software program is provided that is non-intrusive and allows multiple persons to debug concurrently in view private sessions. In one example, a method includes preserving a memory state of a portion of a software program, such as a database system. A debug command is received that, when executed, would normally cause modification to targeted data in the preserved portion of the software program. The command is executed by making a copy of the targeted data in the preserved portion of the software program. The copy is modified to generate a modified copy of the targeted data without modifying the data that is in the preserved portion of the software program. In subsequent accesses, the user that issued the debug command accesses the modified copy whenever the user would have otherwise accessed the corresponding preserved portion.

20 Claims, 3 Drawing Sheets

METHOD AND APPARATUS FOR DEBUGGING A SOFTWARE PROGRAM

CROSS REFERENCE TO RELATED APPLICATIONS

This application is related-to and claims domestic priority under 35 U.S.C. §119(e) from prior U.S. Provisional Patent Application Serial No. 60/166,598 filed on Nov. 19, 1999 entitled "Debugging Techniques And Fast SGA Dumps To File For Deferred Analysis Of The Database", by inventors Vikram Joshi, Alex Tsukernan, and Shari Yamaguchi, the entire. disclosure of which is hereby incorporated by reference for all purposes as if fully set forth herein.

This application is related to U.S. patent application Ser. No. 09/717,187 filed on Nov. 20, 2000, entitled "Method. and Apparatus for Debugging A Softwae Program, Using Dynamic Debug Patches and Copy On Write Views", by inventors Vikram Joshi, Alex Tsukerman, and Shari Yamaguchi, the entire disclosure of which is hereby incorporated by reference for all purposes as if fully set forth herein.

This application is related to U.S patent application Ser. No. 09/717,162 filed on Nov. 20, 2000, entitled "Fast Database State Dumps to File for Deferred Analysis of a Database", by inventors Vikram Joshi, Alex Tsukerman, and Shari Yamaguchi, the entire disclosure of which is hereby incorporated by reference for all purposes as if fully set forth herein.

This application is related to U.S. patent application Ser. No. 09/717,161 filed on Nov. 20, 2000, entitled "A Debug And Data Collection Mechanism Utilizing A Difference In Database State By Using Consecutive Snapshots Of The Database State", by inventors Vikram Joshi, Alex Tsukerman, and Shari Yamaguchi, the entire disclosure of which is hereby incorporated by reference for all purposes as if fully set forth herein.

FIELD OF THE INVENTION

The present invention generally relates to debugging software programs and, more specifically, to techniques for debugging database systems.

BACKGROUND OF THE INVENTION

In a database system, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database "server" or "instance".

Like most software systems, a database server has complicated shared memory structures. A shared memory structure contains data and control information for a portion of a database system. Because of software, hardware, or firmware bugs that may exist in a complex database system, shared memory structures may become logically incorrect. When structures become logically incorrect, the database is likely to fail. Database failure is typically discovered in the following ways: by checking consistency of structures; by verifying certain assumptions; or by running into corrupted pointers. Attempting to process corrupted pointers will lead to a "crash," where normal database operation is no longer possible.

A major responsibility of the database administrator is to be prepared for the possibility of hardware, software, network, process, or system failure. When shared structures are presumed to be corrupted, the best course of action for a database administrator is to cease further processing of the database. If a failure occurs such that the operation of a database system is affected, the administrator must usually recover the database and return the database to normal operations as quickly as possible. Recovery should protect the database and associated users from unnecessary problems and avoid or reduce the possibility of having to duplicate work manually.

Recovery processes vary depending on the type of failure that occurred, the structures affected, and the type of recovery that is performed. If no files are lost or damaged, recovery may amount to no more than rebooting the database system. On the other hand, if data has been lost, recovery requires additional steps in order to put the database back into normal working order.

Once the database is recovered or rebooted, the immediate problem is quickly resolved, but because the root cause is still undetermined and therefore unresolved, the error condition may resurface, potentially causing several additional outages. Therefore, it is still important to diagnose the state of the structures and data surrounding the database failure. Such a diagnosis may provide valuable information that can reduce the chance of failure in the future. As a practical matter, diagnosing the failure may lead to determining which vendor's hardware or software is responsible for the database failure. Such information is valuable for a vendor's peace of mind, if nothing else. Thus, competing with the goal of recovering the database as quickly as possible, is the goal of determining why the database system failed in the first place.

Unfortunately, even with traditional techniques of diagnosing a database failure, the system administrator is usually unable to obtain a sufficient amount of clues to determine why the failure happened. A deliberate and thorough diagnosis of the failure may require an unacceptable amount of database downtime. For example, any amount of downtime over 30 minutes may be extremely costly for a database that is associated with a highly active web site. Too much downtime may have unduly expensive business ramifications, such as lost revenue and damage to the reputation of the web site owner.

Another problem with traditional debugging techniques is that they can be intrusive. For example, a database system that supports the Structured Query Language (SQL) may be debugged by compiling SQL statements and running against the database. The act of compiling and executing the SQL statements changes the state of the database system. Thus, the mere act of diagnosing the problem can easily make the problem worse because diagnosis may involve altering the state of the database. Diagnosing the problem typically involves using debugging software, which calls for peeking and poking into data structures within the complex memory structures of the database systems. Although the data structures are best left untouched upon a failure, diagnosing the failure may involve working directly on the same data structures from which data is to be obtained. Nevertheless, it is important to preserve the original data and not change the data from its state at time of failure. A customer of the database may take issue to changing the database as such changing may jeopardize or even destabilize their database system.

Effective diagnosis, however, requires getting as much information as possible out of the data structures. It may be useful here to refer to Heisenberg's uncertainty principle, which effectively states that the closer an object is analyzed, the more the object materially changes because the mere act of analyzing is intrusive. Applying this principle to the act of diagnosing a database failure, a typical debugging process is naturally intrusive. Thus, it is difficult to be non-intrusive on a database and at the same time obtain a sufficient amount of meaningful data for debugging.

Traditional debugging techniques involve formatting certain parts of the database system and displaying this formatted portion in a human-readable form. This human-readable form can be set aside for later analysis, for example, after the database has been recovered or is no longer down. The entire memory of the database server is not dumped because an average database server is very large, typically between about 200 megabytes and about 100 gigabytes of unformatted binary and data. On the portion of the database that is formatted, an educated guess is made of the key data structures that are potential causes of the problem.

Unfortunately, such a debugging technique provides diagnosis only to the database's end-memory state, which is the state after the database has been shutdown. Because the end-memory state is being analyzed separately from the database, the programmer performing the debugging does not have access to the real database and some of the database's persistent structures. Some of these persistent structures could be on disk or, in a multiple node system, on other nodes. For example, in a parallel server configuration, the persistent structures needed for debugging could reside on other servers. Thus, the technique of separately debugging portions of the database prevents the programmer from using the data that can only be obtained from the database itself.

Further, where debug operations are performed on the database while the database is down, multiple programmers cannot each privately diagnose the failure. Rather, the key data structures are typically diagnosed by having one programmer in front of a console inputting debug commands, while other programmers gather around issuing advice. Multiple programmers individually debugging the database is unadvisable using existing debugging techniques because the act of inputting debug commands is intrusive, as mentioned above. Each programmer's work would interfere with the concurrent debugging progress of fellow programmers.

For the foregoing reasons, what is needed is a method of debugging a software program, such as a database system, that is non-intrusive, yet allows for a comprehensive assessment of a failure.

SUMMARY OF THE INVENTION

A method and apparatus for debugging a software program is provided that is non-intrusive and allows multiple persons to debug concurrently. In one embodiment, a method comprises preserving a memory state of a portion of a software program, such as a database system. A debug command is received that, when executed, would normally cause modification to targeted data in the preserved portion of the software program. The command is executed by making a copy of the targeted data in the preserved portion of the software program. The copy is modified to generate a modified copy of the targeted data without modifying the data that is in the preserved portion of the software program. In subsequent accesses, the user that issued the debug command accesses the modified copy whenever the user would have otherwise accessed the corresponding preserved portion.

In another embodiment, a computer-readable medium is described that stores a preserved portion of a software program and a modified page of memory of the preserved portion. The modified page corresponds to a page in the preserved portion. The modified page has a modification that normally would have been made to the corresponding page in the preserved portion. The preserved portion is unaltered.

Advantageously, the present invention allows multiple persons to concurrently debug a problem of a software program. Each person preferably has their own private view, which consists of (1) copied portions of the software program that reflect modifications made by that person, and (2) the portions of the preserved software program that the person has not modified. Providing a private view to each person allows each person to debug privately, independently, and concurrently with others. Each private view may be extensively explored and modified without affecting the memory state of the software program that existed at the time the software program was shutdown. Accordingly, at any time, each private view may be refreshed to the state of the software program that existed at the time of shutdown. Faster diagnosis of the problem may therefore be accomplished because a debugger does not have to peek cautiously and slowly into the inter-workings of the software program. Thus, where downtime of a software program must be kept to a minimum, the present invention provides techniques for performing quick and comprehensive diagnostics of the software.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for non-intrusive debugging of a software program are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
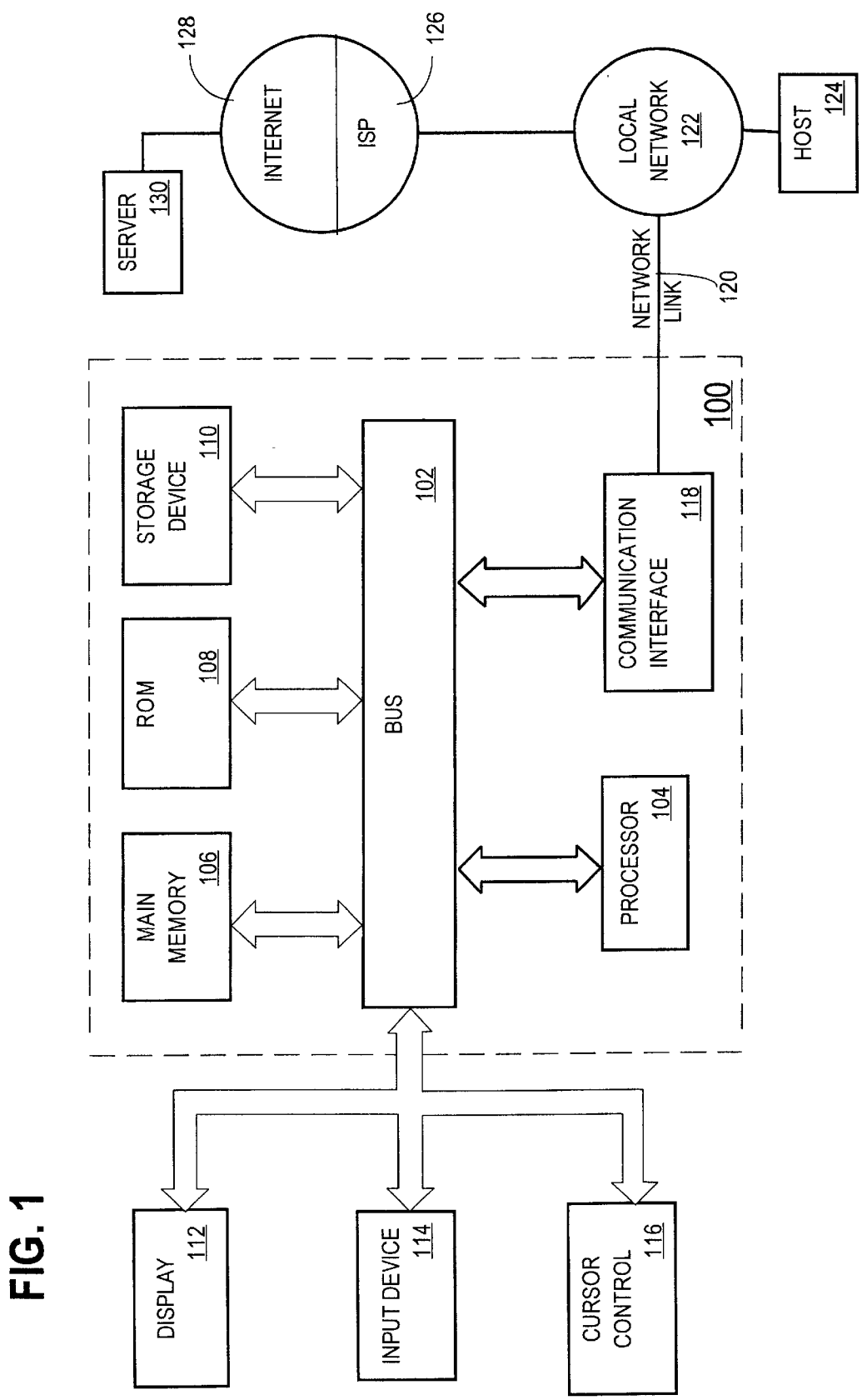
FIG. 1 is a block diagram that illustrates a computer system upon which an embodiment of the invention may be implemented.

FIG. 1 is a block diagram that illustrates a computer system 100 upon which an embodiment of the invention may be implemented. Computer system 100 includes a bus 102 or other communication mechanism 270 for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for distributed lock management. According to one embodiment of the invention, re-mastering is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for distributed lock management as described herein.

The received code may be executed by processor 104 as it is received, and/or stored in storage device 110, or other non-volatile storage for later execution. In this manner, computer system 100 may obtain application code in the form of a carrier wave.

DEBUGGING TECHNIQUE

A database administrator may cause a database system to cease execution for a number of reasons, which are discussed above. Diagnosing a database will typically lead to modifying data in the database while it is down. As explained above, it is desirable to preserve the memory state that existed at the time of failure or at the time the database was shutdown.

Figure 2:
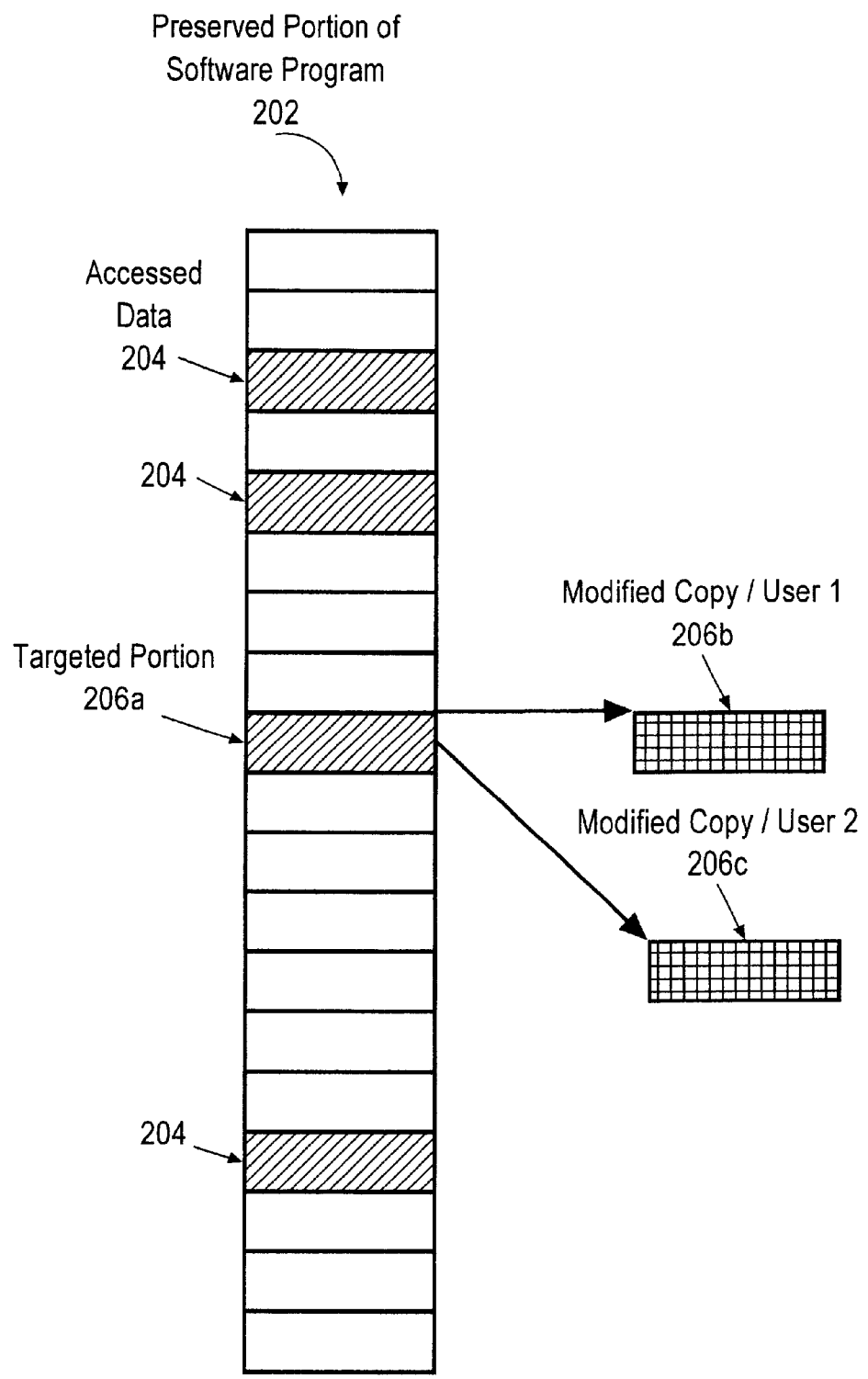
FIG. 2 illustrates how data is copied before being modified in response to a debug operation to preserve the memory state of a software program.

FIG. 2 illustrates how data is copied before being modified in response to a debug operation to preserve the memory state of a software program. For the purpose of explanation, it will be assumed that the software program is a database server. However, the present techniques are not limited to any particular type of program. A database administrator, for example, "freezes" a portion of a database to preserve the memory state of the database system. Preserving the database may include suspending a failed process within the database system. Various techniques may be used to freeze the state of a database server. One such technique is described in U.S. patent application Ser. No. 09/223,660 entitled "METHOD AND SYSTEM FOR DIAGNOSTIC PRESERVATION OF THE STATE OF A COMPUTER SYSTEM" filed by Wei Hu and Juan Loaiza on Dec. 30, 1998, the contents of which is incorporated herein by reference.

The act of preserving the database may be initiated by giving the software program an explicit "freeze" user command. Alternatively, the act of preserving the database may be initiated in response to an automatic trigger that fires when an error event is detected. The techniques described hereafter indicate how debugging may be performed, even by multiple users concurrently, without changing any data in the preserved portion 202. Any operation that could cause any change within the preserved portion is disabled with respect to the preserved portion 202.

In one embodiment, the software program is a database server that is composed of a memory portion referred to as a "database instance", and a set of data on disk referred to as "datafiles". In addition, one database server may be shared in a hardware cluster with additional database instances residing on different nodes, but still sharing access to the same set of datafiles. Preferably, the database administrator will be able to issue a command to preserve only the database instance that has failed, thereby detaching the preserved database instance from the cluster membership. In such a situation, it is important to exercise care while using the preserved database instance in this state, and to not affect the integrity of the datafiles or other database instances. Preferably, a database administrator only uses such a detached preserved database instance for debugging operations. Detaching a database instance from a cluster involves isolating the instance from the rest of the cluster using software and hardware means.

While the software program is preserved, debugging operations may begin. FIG. 2 shows the preserved portion 202 having segments of data. These segments of data are preferably pages of memory. When a user initiates a debug command, segments of the preserved portion 202 are accessed. For example, a read operation accesses data 204. The debug command may also call for a write operation to be performed on some data within the preserved portion 202. The data within the reserved portion that is targeted by the write operation is referred to herein as targeted data 206a. In response to an attempt to perform a write operation on data within the targeted data 206a, a copy is made of the targeted data 206a. The actual modification that would have been made to the targeted data 206a is instead made to the copy, creating a modified copy 206b. In one embodiment, the modified copy 206b is a copy-on-write page of memory.

In subsequent debugging operations, relative to the user that issued the debug command that made the modification, the modified copy 206b takes the place of the targeted data 206a. Thus, if that user issues subsequent debug commands to read targeted data 206a, the read operation would be performed on the modified copy 206b. Similarly, if that same user issues a debug command that would perform another modification to the targeted data 206a, the modification would once again be performed on the modified copy 206b.

For simplification purposes, FIG. 2 shows a scenario in which only one modified copy 206b has been made. However, debug operations may actually perform modifications to many areas of a program, and therefore cause the generation of a multitude of modified copies.

In one embodiment, the memory segments of the preserved portion 202 are pages in memory. Preferably, a page map is used to keep track of all the pages of the modified copies for each user. For example, the modified copy 206b may be a copy-on-write page, the address of which is kept in a page map. Using this copying technique, the original preserved portion 202 of the software program is unaltered. The page mapping software and hardware ensures that the view private modified page is mapped at the same virtual address as the original page, thus preserving the integrity of data structure references, indices, and pointers.

The modified copies for a user may be discarded at anytime. Thus, a fresh debug session may be initiated at any time using the preserved portion 202 and the aforementioned copying technique.

According to one embodiment, a separate set of modified copies are maintained for each user, based on the modifications made by that user. Specifically, each user sees (1) the modified copies that have been generated in response to the debug commands that have been issued by that user, and (2) the preserved portions of the software program that have not been modified in response to debug commands that have been issued by that user. The modified copies may be managed in a view private fashion using any one of a number of techniques, including page mapping software and hardware techniques.

Consequently, multiple programmers can debug the software program concurrently, independently, and privately. The debug progress of one debugger will not affect the debug progress of another debugger. Accordingly, any number of debug sessions can be generated and later destroyed. Such multiple-session debugging should lead to a relatively quick and comprehensive assessment of the failure. For example, in FIG. 2, a user 1 modifies 206a and 206b is created. A user 2 modifies 206a and 206c is created. User 1 cannot see the changes in 206c, and user 2 cannot see the changes in 206b.

One debug session can be used to issue numerous commands. The debugger of a particular debug session has a private view of the software program in a privately modified state. This privately modified state is a side-effect of the aforementioned copying technique. Extensive peeking of the privately viewed data has the benefit of extracting valuable state that may point to the problem. In other words, the privately viewed data may be extensively explored and modified without fear of altering the preserved portion 202, which represents the original data. This mechanism allows the software program to be debugged at a high-level in a more efficient and speedy manner.

For example, where the software program is a database system, the debugging may be performed, at least in part, by issuing SQL commands to the database system. The SQL commands may be parsed, compiled, and executed using existing shared database state (i.e., the preserved portion 202) and the aforementioned copy-on-write technique.

FIG. 2 is an illustration of the privately viewed data of a debug session at a particular point in time. Thus, at a particular point in time, a debugger sees the preserved portion 202, minus the targeted data 206a, plus the modified copies 206b.

In another embodiment, the software program is a database system that has persistent structures, such as persistent database tables. Persistent structures could be on disk or, in a multiple node system, reside in database instances on other nodes. For example, in a parallel server configuration, the persistent structures needed for debugging could reside on other servers. A debug command may call for accessing data, such as a persistent structure, that is outside the current database instance being debugged. For such data that resides outside the database instance being debugged, it is preferable to mount the data in a read-only mode into the database prior to performing debug operations. Such a mounting step facilitates reads from outside data, such as persistent database tables. Debug operations cannot write to the read-only data. Further, when any operation attempts to write to the read-only data, the debug system preferably produces a logical error message, which the debug system makes known to the user. Performing such copying of outside data into the database in a read-only mode also enables application of the aforementioned copy-on-write debug technique for the copied data. Thus, an embodiment of the present invention is applicable to debugging a database where a debug command calls for accessing data that is outside the current database instance.

Figure 3:
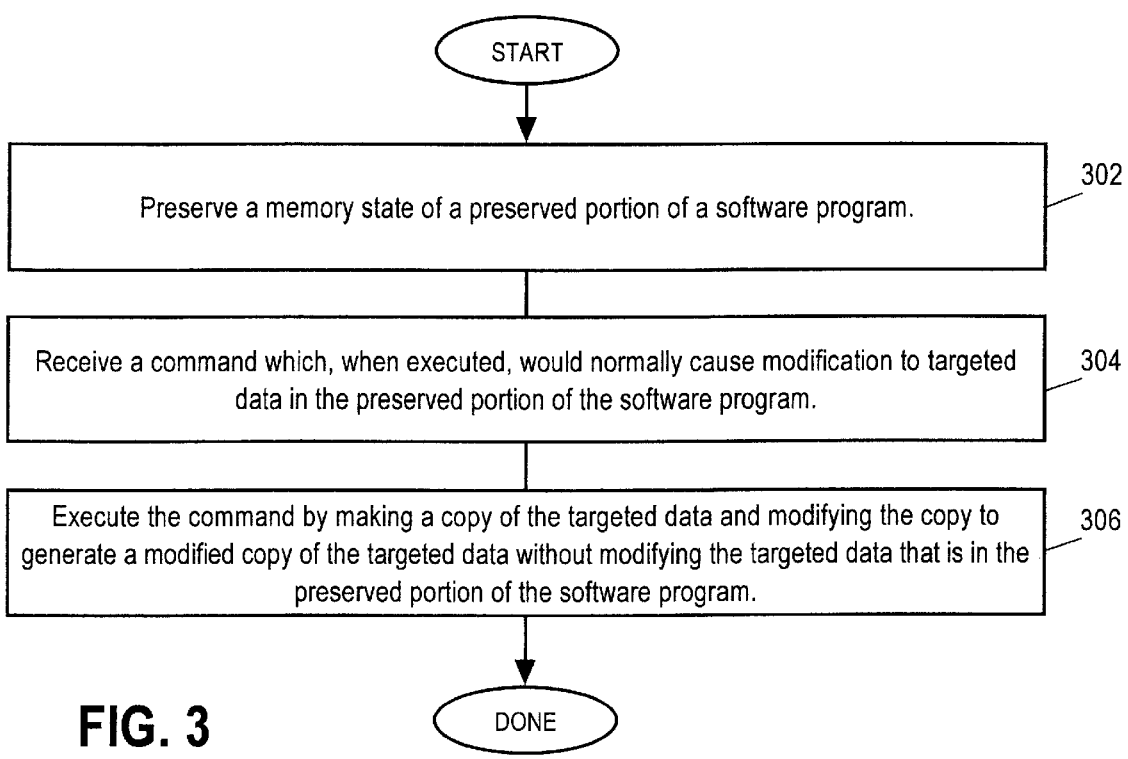
FIG. 3 is a flowchart of a debug technique that allows for non-intrusive debugging of a software program.

FIG. 3 is a flowchart of a debug technique that allows for non-intrusive debugging of a software program. The method starts in step 302, where a memory state of a preserved portion of the software program is preserved. As mentioned in the discussion with reference to FIG. 2, preserving the memory state may include suspending an application that has failed. In step 304, a command is received which, when executed, would normally cause modification to targeted data 206a in the portion of the software program that is being preserved. Where the software program is a database system, the debug command may be issued using SQL. Even if the SQL statement thus issued is only to retrieve data, execution of the statement may cause numerous write operations to be performed during the parsing, compiling and execution of the statement.

The debug command is executed in step 306. However, even though the command is executed, no modification to the targeted data 206a actually occurs. Rather, a copy is made of the target data 206a of the preserved portion 202 of the software program. This copy is modified to generate a modified copy 206b of the targeted data 206a without modifying the targeted data 206a in the preserved portion 202 of the software program. For example, an attempt to modify targeted data 206a of the preserved portion 202 of a database preferably causes a copy-on-write to occur, creating a modified copy 206b of the targeted data 206a.

According to one embodiment, each user's debug session creates a view private state as a result of the high-level debugging operations (e.g. performing debugging by issuing SQL). When sufficient view-private state has accumulated, the view-private state may interfere with the original preserved state of the database. In one embodiment, users have discretion with respect to when they disregard the debug session and start a new session to continue extraction of valuable diagnostic information from where they left off in the previous session. The new session allows the same user to start from the original pristine frozen view of the database at the time of the failure. Thus, the techniques described herein allow more information to be obtained in every subsequent debug session by the same user, with incremental progress in the debug operation, but with nominal variance between the frozen preserved state at failure and the current view private state within the debug session.

In one embodiment, a debugger may subsequently initiate a debug command that causes an attempt to access data in the preserved portion 202 that has a modified copy 206b. Upon such an attempt, the modified copy 206b is accessed instead of the data in the preserved portion 202. The modified copy 206b is accessed in a modified private view, as discussed above with reference to FIG. 2. Such accessing may occur, for example, where a debug command invokes a write or read request. In a preferred embodiment, during a private session, only the user of the private session may access the modified copies 206b.

CONCLUSION

Techniques are described above for debugging a software program. In a preferred embodiment, the software program is preserved before debug operations are performed on the software program. A copy-on-write step is performed on accessed data that is to be modified. During the debug process, modifications are made to the copied data of the software program, and not to the preserved portion 202. While the above description provides a database system as an example of a software program, the present invention generally applies to all software programs.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of debugging a software program, the method comprising the steps of:

preserving a memory state of a preserved portion of the software program;

receiving a debug command which, when executed, would cause modification to targeted data in the preserved portion of the software program; and executing the debug command by making a copy of the targeted data and modifying the copy to generate a modified copy of the targeted data without modifying the targeted data that is in the preserved portion of the software program.

2. The method of claim 1, wherein the software program is a database system.

3. The method of claim 1, wherein the step of preserving further includes the step of suspending a failed application of the database system.

4. The method of claim 1, wherein the debug command is a Structured Query Language (SQL) command.

5. The method of claim 4, wherein upon receiving the debug command, the method further includes the steps of:

compiling the debug command; and parsing the debug command.

6. The method of claim 1, further including the step of, in response to a subsequent attempt to access the targeted data in the preserved portion of the software program, accessing the modified copy of the target data.

7. The method of claim 6, wherein the debug command is initiated by a particular user, and wherein the step of accessing the modified copy occurs only if that particular user initiates the subsequent attempt to access the data.

8. The method of claim 6, wherein the debug command is initiated by a particular user, and wherein the step of accessing the modified copy does not occur if a different user other than the particular user initiates the subsequent attempt to access the data.

9. The method of claim 1, wherein:
the debug command is a first debug command issued by a first user;
the modified copy is a first modified copy of the targeted data;
the method further includes the steps of:
  after the modified copy has been created for the first user, receiving a second debug command issued by a second user which, when executed, would cause modification to the targeted data in the preserved portion;
  executing the second debug command by making a second copy of the targeted data and modifying the second copy to generate a second modified copy, the second modified copy being separate from the first modified copy and from the preserved portion.

10. A computer-readable medium, storing:
a preserved portion of a software program, the preserved portion having one or more preserved pages of memory that reflect the state of the software program at a first point in time;
a first modified page that corresponds to a particular original page, the first modified page having a modification caused by a first user performing a debug operation at a second point in time after the first point in time, wherein the debug operation called for modification of data within the particular original page.

11. The computer-readable medium of claim 10, wherein the software program is a database system.

12. The computer-readable medium of claim 10 further comprising a second modified page that corresponds to the particular original page, the second modified page having a modification caused by a second user performing a second debug operation at a third point in time after the first point in time, wherein the second debug operation called for modification of data within the particular original page.

13. A computer-readable medium bearing instructions for debugging a software program, the instructions arranged, when executed by one or more processors, to cause the one or more processors to perform the steps of:
preserving a memory state of a preserved portion of the software program;
receiving a debug command which, when executed, would cause modification to targeted data in the preserved portion of the software program; and
executing the debug command by making a copy of the targeted data and modifying the copy to generate a modified copy of the targeted data without modifying the targeted data that is in the preserved portion of the software program.

14. The computer-readable medium of claim 13, wherein the software program is a database system.

15. The computer-readable medium of claim 13, wherein the step of preserving further includes the step of suspending a failed application of the database system.

16. The computer-readable medium of claim 13, wherein the debug command is a Structured Query Language (SQL) debug command.

17. The computer-readable medium of claim 16, wherein upon receiving the debug command, the instructions are further arranged to cause the one or more processors to perform the steps of:
compiling the debug command; and
parsing the debug command.

18. The computer-readable medium of claim 13, wherein the instructions are further arranged to cause the one or more processors to perform the step of, in response to a subsequent attempt to access the targeted data in the preserved portion of the software program, accessing the modified copy of the target data.

19. The computer-readable medium of claim 18, wherein the debug command is initiated by a particular user, and wherein the step of accessing the modified copy occurs only if that particular user initiates the subsequent attempt to access the data.

20. The computer-readable medium of claim 18, wherein the debug command is initiated by a particular user, and wherein the step of accessing the modified copy does not occur if a different user other than the particular user initiates the subsequent attempt to access the data.

* * * * *